Patented Aug. 1, 1950

2,517,222

UNITED STATES PATENT OFFICE 2,517,222

OIL SOLUBLE RESINS

Theodore P. Malinowski, Springfield, Mass., assignor to Monsanto Chemical Company, St. Louis, Mo., a corporation of Delaware No Drawing. Application December 14, 1948, Serial No. 65,297

12 Claims. (Cl. 260—23)

This invention relates to oil-soluble resins.

Resins made from vinyl benzenes have been used extensively for molding purposes. Attempts have been made to use such resins in coating compositions but various difficulties have arisen in so doing. In view of the availability of vinyl benzenes, particularly styrene, in large quantities, the use of resins made from such materials in coating compositions would open up a considerable field of application.

It is an object of this invention to provide a new type of synthetic resin for use in coating compositions. A particular object of this invention is to provide oil-soluble resins made from vinyl benzenes. A further object is to provide new and improved coating compositions.

These and other objects are obtained by reacting hydroxy-dihydro-dicyclopentadiene with the reaction product of maleic anhydride and unsaturated vinyl benzene polymers. Thus, it is discovered that such resins are soluble in vegetable oils over a wide range of proportions.

The following examples are illustrative of the present invention but are not to be construed as limitative thereof. Where parts are given, they are parts by weight.

EXAMPLE I 5 parts of Resin A are mixed with 1 part of maleic anhydride and the mixture heated in an open vessel at 250° C. until the mixture is clear and homogeneous at room temperature. The resulting product is found to be compatible with tung oil and bodied dehydrated castor oil.

An excess of hydroxy-dihydro-dicyclopentadiene (5% based on the amount of maleic anhydride used) is added to the above product and the mixture heated in an open vessel at 150° C. to bring about esterification. After heating for 15 minutes, the temperature is gradually increased to 330° C. to remove excess alcohol. The final product is a hard, brittle resin at room temperature. The hydroxy-dihydro-dicyclopentadiene reaction product is mixed with an equal amount of tung oil and the mixture heated at 150° C. for 20 minutes, followed by heating at 350° C. until the mixture is bodied, i. e., strings form when a stirring rod is slowly removed therefrom. After the addition of sufficient cobalt naphthenate drier to provide 0.01 part cobalt for every 100 parts of the tung oil varnish, a xylol solution of the varnish is used to form films which, after baking for 30 minutes at 135° C. are light colored, very flexible, rubbery, dry, tough, glossy and resistant to solvents for the unbaked material.

EXAMPLE II 6 parts of the fraction of Resin B melting at 60–105° C. are mixed with 1 part of maleic anhydride and the mixture is heated up to 290° C. over a 20-minute period in an open vessel to form a product which is clear and homogeneous at room temperature. An excess (5%) of hydroxy-dihydro-dicyclopentadiene (based on the amount of maleic anhydride introduced) is added and the mixture heated for an additional 5 minutes at 290° C. The product is clear, hard and brittle at room temperature.

45 parts of hydroxy-dihydro-dicyclopentadiene reaction product are mixed with 54 parts of tung oil and 12 parts of bodied linseed oil and the mixture heated at 280° C. for about ½ hour, whereupon the mixture is found to be bodied. After dissolving in 100 parts of toluene, the product is filtered and cobalt naphthenate drier to provide 0.01% cobalt based on the undiluted varnish incorporated. Films are formed from this material and baked for 30 minutes at 135° C. The baked films are clear, light in color, flexible and tough. They are found to have excellent water resistance and resistance to such solvents as xylol and toluene.

EXAMPLE III 150 parts of Resin C are admixed with 30 parts of maleic anhydride and heated in an open vessel at 280° C. until a sample, on cooling, is substantially homogeneous.

113 parts of the maleic anhydride modified-polymer are admixed with 56 parts of hydroxy-dihyro-dicyclopentadiene and heated in an open vessel at 250° C. until a sample is hard at room temperature; this requires about 25 minutes. A varnish is prepared from this hydroxy-dihydro-dicyclopentadiene modified resin on the manner used in Example II. About 20 minutes are required to heat the mixture of oil and resin to 280° C. and another 20 minutes at 280° C. to cause the mixture to body. This varnish is light in color and shows no signs of gelling after 60 days standing.

In contrast to the varnish prepared from the hydroxy - dihydro - dicyclopentadiene modified resin of Example III, attempts to prepare a similar varnish, except that there is substituted for the hydroxy-dihydro-dicylopentadiene modified resin the polymerized alpha-methyl styrene without any modification, result in relatively unstable products. Thus, it is found that the resulting oil varnish gels on standing in less than 30 days, even when no drier is incorporated therein.

Similarly, the use of the maleic anhydride-modified polymer yields an oil varnish which is inferior to the varnish described above in Example III, although somewhat superior to the varnish prepared from the unmodified polymer.

EXAMPLE IV

Example I is repeated except that Resin E is substituted for Resin A in the same amount. The reaction with maleic anhydride yields an oil-soluble product as in the case of Example I. This oil-soluble product may be further reacted with hydroxy-dihydro-dicyclopentadiene to form a resin which may be compounded with glyceride oils as in Example I to form coating compositions having unique properties.

The following examples illustrate the preparation of unsaturated polymers of alpha-methyl styrene, including the polymers used in the specific examples. As indicated hereinafter, other methods are set forth in British Patent 524,156.

*Resin A*

2 parts of fuller's earth are added to 324 parts of alpha methyl styrene. The mixture is allowed to stand without stirring until an exothermic reaction sets in, whereupon, the mixture is agitated and maintained at a temperature below 48° C. by intermittent cooling. After the exothermic reaction subsides, an additional 2 parts of fuller's earth is added and the process described above is repeated. Another 2 parts of fuller's earth is added after the exothermic reaction subsides and again the reaction continues with stirring and cooling to maintain the temperature under 48° C. After the exothermic reaction again subsides, the reaction mixture is heated at a temperature of about 80° C. with the addition of an additional two parts of fuller's earth for about 1 hour. The total reaction time is about 5 hours. The reaction product is a viscous liquid which, after dilution with 300 parts of benzene, is filtered and then subjected to vacuum distillation to remove volatile materials. The residue from the vacuum distillation at a maximum pot temperature of 225° C. and an absolute pressure corresponding to 13 mm. of mercury, is very hard at room temperature. It contains ethylenic unsaturation in that it readily absorbs bromine. It may be dissolved in both raw and bodied tung oil by heating.

*Resin B*

0.4 part of fuller's earth that is activated by heating at 115° C. for 2 hours is added to 100 parts of alpha-methyl styrene. An exothermic reaction sets in and cooling is required to maintain the temperature at below 44° C. The resulting product is very viscous and is diluted with 60 parts of benzene. Further intermediate additions of 0.4 part of fuller's earth are made to maintain the exothermic reaction until a total of 2 parts of fuller's earth is present. The total reaction time is 5 hours.

After filtering the product, 10% of the polymer is precipitated by the addition of methanol. It is found to have a cryoscopic molecular weight of 1432 which corresponds to 12.1 alpha-methyl styrene units. A rapid melting point determination shows a melting point range of 121–160° C.

Further precipitation of polymer from the benzene solution yields a product having a molecular weight of 534 which corresponds to 4.5 alpha-methyl styrene units. This fraction has a melting point range of 60–105° C.

*Resin C*

2 parts of fuller's earth activated as in the case of Resin B is mixed with 500 parts of alpha-methyl styrene. An exothermic reaction sets in and the temperature is maintained in the range 45° to 60° C. by external cooling. After about 25 minutes the exothermic reaction subsides and an additional 2 parts of fuller's earth is added. The mixture is diluted with 300 parts of benzene and maintained at about 40° C. for about 140 minutes. Thereafter, another 2 part addition of fuller's earth is made, but no further exothermic reaction sets in. The mixture is then filtered and the filtrate subjected to vacuum distillation at a maximum pot temperature of about 260° C. and a maximum distillate temperature of 200° C. under an absolute pressure corresponding to 12 mm. of mercury. The residue, which amounts to 290 parts, is found to absorb bromine and is a colorless, hard, resinous material.

*Resin D*

1 part of fuller's earth is mixed with 100 parts of alpha-methyl styrene at room temperature. An exothermic reaction sets in and the temperature is maintained between 15 and 30° C. by intermittent cooling. After the exothermic reaction subsides, an additional part of fuller's earth is added and again an exothermic reaction sets in. The temperature is allowed to rise to 33° C. over a period of 60 minutes. The total reaction time is 3 hours.

The reaction product is a very viscous liquid which after dilution with 25 parts of benzene is filtered and the polymer precipitated from the filtrate by addition of methanol. The precipitated material, after drying, is a white, hard, brittle polymer which is found to be soluble in tung oil and dehydrated castor oil. It may be reacted with maleic anhydride and then with hydroxy-dihydro-decyclopentadiene to yield products similar to those prepared from Resins A, B, and C.

*Resin E*

Resin A is repeated except that styrene is substituted for alpha-methyl styrene in the same amount. The polymeric product is soluble in glyceride oils such as tung oil and is found to have ethylenic unsaturation.

Numerous variations may be introduced into the preparation of the resins of the invention. Thus, as shown by the specific examples, considerable variation is permissible in the preparation of the unsaturated vinyl benzene polymer. Other variations are set forth in British Patent 524,156. For example, in place of fuller's earth, other clays may be used as catalysts, e. g., bentonite, bleaching earths, and silica gel. Preferably these catalysts are activated by heating; e. g., at 100–500° C. for 1 to 10 hours in order to enhance their catalytic effect.

In order to ensure the preparation of an unsaturated polymer, the initial polymerization temperature is maintained at not over 80° C., e. g., 15–80° C., and preferably at 30–80° C. The polymerization is continued, preferably until the exothermic reaction subsides (as evidenced by the lack of an exothermic reaction on the addition of fresh catalyst). The maximum amount of unsaturation in the polymer is one ethylenic double bond in each polymer molecule, and the polymerization is so conducted as to yield a polymer with an average of at least one ethylenic double bond for every five polymer molecules, i. e., at least 20% unsaturated and preferably, at least one double bond for every two polymer molecules, i. e., at least 50% unsaturated. The unsaturation of Resins A-E, inclusive, falls within this range, i. e., they are at least 20% unsaturated.

While the amount of catalyst may be substantially varied in polymerizing the vinyl benzene materials, it is usually found that 0.5–5% of catalyst based on the amount of monomer yields advantageous products.

Usually the vinyl benzene compounds are polymerized while dissolved in an inert solvent or diluent. Examples of suitable solvents or diluents include benzene, toluene, xylene, ethylene dichloride, and the like. While the amount of solvent or diluent may be substantially varied, it is preferred to use 25 to 100 parts for every 100 parts of polymerizable material.

The unsaturated polymers for use in preparing the products of the invention may be made from various vinyl benzene compounds as well as mixtures thereof. Examples of suitable compounds include styrene, alpha-methyl styrene, ortho-methyl styrene, para-methyl styrene, para-phenyl styrene, ortho-chloro styrene, para-chloro styrene, ortho-bromo styrene, dichlorostyrenes, such as 2,5-dichloro-styrene, para-isopropyl styrene-, alpha-chlorostyrene and the like.

The maleic anhydride is reacted with the unsaturated polymer by heating a mixture thereof at an elevated temperature, e. g., 75 to 250° C. The heating is continued until a sample is found to be clear and homogeneous at room temperature. Preferably, 4–40 parts of maleic anhydride are used for every 100 parts of the unsaturated polymer.

Thereafter, hydroxy - dihydro - dicyclopentadiene is reached with the maleic anhydride complex. The amount of hydroxy-dihydrodicyclopentadiene may vary from that required to form a half ester with each anhydride or acid group to an amount equivalent to each carboxyl or anhydride group in the complex, and, if desired, a small excess, e. g., 5–10% of hydroxy-dihydro-dicyclopentadiene may be used to expedite the esterification of all of the carboxyl or anhydride groups. Any unreacted hydroxy-dihydro-dicyclopentadiene may be removed by volatilization or other means. In general, a temperature of 200 to 250° C. is preferred for the reaction between the hydroxy-dihydro-dicyclopentadiene and the maleic anhydride resin complex.

Hydroxy-dihydro-dicyclopentadiene has the formula

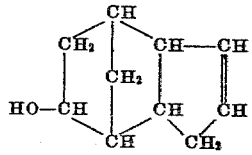

A method for preparing this compound is described in U. S. Patent 2,385,788.

As indicated by the examples, the vinyl benzene polymer-maleic anhydride-hydroxy-dihydro-dicyclopentadiene reaction product is of unexpected merit in admixture with glyceride oils. Such products are especially valuable as surface coating compositions.

Various drying and semi-drying glyceride oils may be used in conjunction with the hydroxy-dihydro-dicyclopentadiene resins of the invention. Examples of such oils include linseed, perilla, soy bean, sunflower, safflower, sesame, corn, poppyseed, walnut, sardine, China-wood (tung), oiticica, dehydrated castor, cotton-seed, peanut, rapeseed, etc. Valuable compositions may also be made with the so-called non-drying oils, e. g., olive, coconut, castor, palm, etc. These and other oils may also be used in the blown or bodied state. Mixtures of oils may be used when desired. Also mono- and di-glycerides may be used in place of or in admixture with tri-glycerides.

The resin products of the invention are compatible with the above glycerides in widely varying proportions. However, for most purposes, from 30 to 60 parts of resin are used for every 100 parts of glyceride in formulating surface-coating compositions.

The hydroxy-dihydro-dicyclopentadiene resins of the invention may be used to modify alkyd resins, e. g., glyceryl phthalate resins or oil acid modified alkyd resins, e. g., glycerin-phthalic anhydride-linseed oil acid polyester resins. The hydroxy-dihydro-dicyclopentadiene resin may be incorporated at a suitable stage of the polyester reaction, i. e., either before or during the polyester reaction or in the final compounding of the alkyd resin for its ultimate use. Mono- and/or polyhydric alcohols may be included to react with any free carboxyl groups in the hydroxy - dihydro - dicyclopentadiene resin. For most purposes 5–50 parts of the hydroxy-dihydro-dicyclopentadiene resins of the invention are incorporated for each 100 parts of alkyd. However, larger or smaller amounts may be employed to yield useful products.

The coating compositions of the invention may be formulated in the usual manner with driers as, for example, the napthenates, resinates and oleates of cobalt, manganese, lead, zinc, etc., or mixtures thereof, pigments and other conventional additives and modifiers.

It is obvious that many variations may be made in the products and processes of this invention without departing from the spirit and scope thereof as defined in the appended claims.

What is claimed is:

1. An oil-soluble resin composition which comprises the heat reaction product of hydroxy-dihydro-dicyclopentadiene and the heat reaction product of from 4 to 40 parts of maleic anhydride and 100 parts of an ethylenically unsaturated monovinyl benzene homopolymer having from 1 to 5 ethylenic double bonds for every 5 molecules in the polymeric product, said vinyl benzene being taken from the group consisting of styrene, alpha-methyl styrene, ortho-methyl styrene, para-methyl styrene, para-phenyl styrene, ortho-chloro styrene, para-chloro styrene, ortho-bromo styrene, dichlorostyrenes, para-isopropyl styrene and alpha-chloro styrene, said polymer having been prepared by polymerizing the vinyl benzene at from 15° C. to 85° C. in an inert solvent in contact with an activated clay catalyst until the exothermic reaction is complete.

2. An oil-soluble resin as defined in claim 1 in which the vinyl benzene is styrene.

3. An oil-soluble resin as defined in claim 1 in which the vinyl benzene is alpha-methyl styrene.

4. An oil-soluble resin as defined in claim 1 in which the vinyl benzene polymer contains 2–4 ethylenic double bonds for every four molecules in the polymeric product.

5. An oil-soluble resin as defined in claim 4 in which the vinyl benzene is styrene.

6. An oil-soluble resin as defined in claim 4 in which the vinyl benzene is alpha-methyl styrene.

7. An improved coating composition comprising a glyceride oil and an oil-soluble resin which is the heat reaction product of hydroxy-dihydro-dicyclopentadiene and the heat reaction product of from 4 to 40 parts of maleic anhydride and 100 parts of an ethylenically unsaturated monovinyl benzene homopolymer having from 1 to 5 ethylenic double bonds for every 5 molecules in the polymeric product, said vinyl benzene being taken from the group consisting of styrene, alpha-methyl styrene, ortho-methyl styrene, para-methyl styrene, para-phenyl styrene, ortho-chloro styrene, para-chloro styrene, ortho-bromo styrene, dichlorostyrenes, para-isopropyl styrene, and alpha-chloro styrene, said polymer having been prepared by polymerizing the vinyl benzene at from 15° C. to 85° C. in an inert solvent in contact with an activated clay catalyst until the exothermic reaction is complete.

8. A composition as defined in claim 7 in which the glyceride oil is a drying oil.

9. A composition as defined in claim 7 in which the glyceride oil is a semi-drying oil.

10. An improved coating composition comprising a glyceride drying oil and an oil-soluble resin which is the heat reaction product of hydroxy-dihydro-dicyclo-pentadiene and the heat reaction product of from 4 to 40 parts of maleic anhydride and 100 parts of an ethylenically unsaturated monovinyl benzene homopolymer having from 2 to 4 ethylenic double bonds for every 4 molecules in the polymeric product, said vinyl benzene being taken from the group consisting of styrene, alpha-methyl styrene, ortho - methyl styrene, para-methyl styrene, para-phenyl styrene, ortho-chloro styrene, para-chloro styrene, ortho-bromo styrene, dichloro-styrenes, para-isopropyl styrene and alpha-chloro styrene, said polymer having been prepared by polymerizing the vinyl benzene at from 15° C to 85° C. in an inert solvent in contact with an activated clay catalyst until the exothermic reaction is complete.

11. A composition as defined in claim 10 in which the vinyl benzene is styrene.

12. A composition as defined in claim 10 in which the vinyl benzene is alpha-methyl styrene.

THEODORE P. MALINOWSKI.

REFERENCES CITED

The following references are of record in the file of this patent:

UNITED STATES PATENTS

| Number | Name | Date |
|---|---|---|
| 2,047,398 | Voss et al. | July 14, 1936 |
| 2,385,788 | Bruson | Oct. 2, 1945 |